US011537719B2

(12) United States Patent
Li et al.

(10) Patent No.: US 11,537,719 B2
(45) Date of Patent: Dec. 27, 2022

(54) DEEP NEURAL NETWORK SYSTEM FOR SIMILARITY-BASED GRAPH REPRESENTATIONS

(71) Applicant: DeepMind Technologies Limited, London (GB)

(72) Inventors: Yujia Li, London (GB); Chenjie Gu, Mountain View, CA (US); Thomas Dullien, Zurich (CH); Oriol Vinyals, London (GB); Pushmeet Kohli, London (GB)

(73) Assignee: DeepMind Technologies Limited, London (GB)

( * ) Notice: Subject to any disclaimer, the term of this patent is extended or adjusted under 35 U.S.C. 154(b) by 894 days.

(21) Appl. No.: 16/416,070

(22) Filed: May 17, 2019

(65) Prior Publication Data

US 2019/0354689 A1 Nov. 21, 2019

Related U.S. Application Data

(60) Provisional application No. 62/673,841, filed on May 18, 2018.

(51) Int. Cl.
*G08B 23/00* (2006.01)
*G06F 12/16* (2006.01)
(Continued)

(52) U.S. Cl.
CPC ........ *G06F 21/577* (2013.01); *G06F 16/9024* (2019.01); *G06F 17/16* (2013.01); *G06K 9/6215* (2013.01); *G06N 3/04* (2013.01)

(58) Field of Classification Search
CPC .... G06F 21/577; G06F 16/9024; G06F 17/16; G06K 9/6215
(Continued)

(56) References Cited

U.S. PATENT DOCUMENTS

| 8,429,174 B2* | 4/2013 | Ramani | ................. G06F 16/248 |
| | | | 345/473 |
| 10,339,408 B2* | 7/2019 | Liao | ........................ G06V 10/44 |

(Continued)

OTHER PUBLICATIONS

Bag-of-Words Based Deep Neural Network for Image Retrieval; Yalong Bai; ACM 2014; pp. 229-232.*
(Continued)

*Primary Examiner* — Monjur Rahim
(74) *Attorney, Agent, or Firm* — Fish & Richardson P.C.

(57) ABSTRACT

There is described a neural network system implemented by one or more computers for determining graph similarity. The neural network system comprises one or more neural networks configured to process an input graph to generate a node state representation vector for each node of the input graph and an edge representation vector for each edge of the input graph; and process the node state representation vectors and the edge representation vectors to generate a vector representation of the input graph. The neural network system further comprises one or more processors configured to: receive a first graph; receive a second graph; generate a vector representation of the first graph; generate a vector representation of the second graph; determine a similarity score for the first graph and the second graph based upon the vector representations of the first graph and the second graph.

30 Claims, 7 Drawing Sheets

(51) Int. Cl.

| | |
|---|---|
| G06F 12/14 | (2006.01) |
| G06F 11/00 | (2006.01) |
| G06F 21/57 | (2013.01) |
| G06N 3/04 | (2006.01) |
| G06F 17/16 | (2006.01) |
| G06F 16/901 | (2019.01) |
| G06K 9/62 | (2022.01) |

(58) Field of Classification Search
USPC .......................................................... 726/22
See application file for complete search history.

(56) References Cited

U.S. PATENT DOCUMENTS

| | | | | |
|---|---|---|---|---|
| 10,409,560 | B1* | 9/2019 | Bebee | G06F 8/4441 |
| 11,074,511 | B2* | 7/2021 | Patil | G06N 20/00 |
| 2014/0118350 | A1* | 5/2014 | Imhof | G06T 15/08 |
| | | | | 345/424 |
| 2015/0106311 | A1* | 4/2015 | Birdwell | G06N 3/08 |
| | | | | 706/26 |
| 2015/0142807 | A1* | 5/2015 | Hofmann | G06N 3/02 |
| | | | | 707/759 |
| 2015/0379774 | A1* | 12/2015 | Trainor | H04L 67/561 |
| | | | | 345/633 |
| 2016/0196672 | A1* | 7/2016 | Chertok | G06V 10/454 |
| | | | | 382/156 |
| 2017/0011091 | A1* | 1/2017 | Chehreghani | G06F 16/2455 |
| 2017/0068816 | A1* | 3/2017 | Cavazos | G06F 21/562 |
| 2017/0103337 | A1* | 4/2017 | Cao | G06N 3/08 |
| 2017/0124727 | A1* | 5/2017 | Amat Roldan | G01B 11/02 |
| 2017/0161455 | A1* | 6/2017 | Grady | G16H 30/20 |
| 2017/0213130 | A1* | 7/2017 | Khatri | G06N 3/0445 |
| 2018/0189634 | A1* | 7/2018 | Abdelaziz | G06N 3/04 |
| 2019/0156946 | A1* | 5/2019 | Ulain | G16B 20/00 |
| 2019/0354850 | A1* | 11/2019 | Watson | G06N 3/08 |

OTHER PUBLICATIONS

Al-Rfou et al., "DDGK: Learning graph representations for deep divergence graph kernels," arXiv: 1904,09671, Apr. 21, 2019, 12 pages.
Baldi et al., "Neural networks for fingerprint recognition," Neural Computation, 1993, 5(3):402-418.
Battaglia et al., "Interaction networks for learning about objects, relations and physics," Advances in neural information processing systems, Dec. 2016, 4502-4510.
Battaglia et al., "Relational inductive biases, deep learning, and graph networks," arXiv:1806.01261, Jun. 2018, 40 pages.
Bentley, "Multidimensional binary search trees used for associative searching," Communications of the ACM, Sep. 1975, 18(9):509-517.
Berretti et al., "Efficient matching and indexing of graph models in content-based retrieval," IEEE Transactions on Pattern Analysis and Machine Intelligence, Oct. 2001, 23(10):1089-1105.
Bertinetto et al., "Fully-convolutional Siamese networks for object tracking," European conference on computer vision, Jun. 2016, 850-865.
Borgwardt et al., "Shortest-path kernels on graphs," Data Mining, Fifth IEEE International Conference, Nov. 2005, 8 pages.
Bromley et al., "Signature verification using a "Siamese" time delay neural network," Advances in Neural Information Processing Systems, 1994, 737-744.
Bronstein et al., "Geometric deep learning: going beyond Euclidean data," IEEE Signal Processing Magazine, May 2017, 34(4):18-42.
Bruna et al., "Spectral networks and locally connected networks on graphs," arXiv:1312.6203, Dec. 2013, 14 pages.
Charikar, "Similarity estimation techniques from rounding algorithms," Proceedings of the Thirty-fourth Annual ACM Symposium on Theory of Computing, May 2002, 380-388.
Chopra et al., "Learning a similarity metric discriminatively, with application to face verification," Computer Vision and Pattern Recognition, Jun. 2005, 1:539-546.
CVE.Mitre.org [online], "CVE-2010-0188," retrieved on Dec. 11, 2019, retrieved from URL <https://cve.mitre.org/cgi-bin/cvename.cgi?name=cve-2010-0188>, 2 pages.
CVE.Mitre.org [online], "CVE-2018-0986," retrieved on Dec. 11, 2019, retrieved from URL <https://cve.mitre.org/cgi-bin/cvename.cgi?name=CVE-2018-0986>, 2 pages.
Dai et al., "Learning combinatorial optimization algorithms over graphs," Advances in Neural Information Processing Systems, Apr. 2017, 6351-6361.
Davis et al., "Information-theoretic metric learning," Proceedings of the 24th international conference on Machine learning, Jun. 2007, 209-216.
Dijkman et al., "Graph matching algorithms for business process model similarity search," International Conference on Business Process Management, Sep. 2009, 48-63.
Dullien, "Functionsimsearch," https://github.com/googleprojectzero/functionsimsearch, 2018, 9 pages.
Duvenaud et al., "Convolutional networks on graphs for learning molecular fingerprints," Advances in neural information processing systems, Sep. 2015, 2224-2232.
Erdos et al., "On random graphs I," Publicationes Mathematicae (Debrecen), 1959, 6:290-297.
Eschweiler et al., "discovRE: Efficient cross-architecture identification of bugs in binary code," NDSS, Feb. 2016, 15 pages.
Feng et al., "Scalable graph-based bug search for firmware images," Proceedings of the 2016 ACM SIGSAC Conference on Computer and Communications Security, Oct. 2016, 480-491.
Gao et al., "A survey of graph edit distance," Pattern Analysis and applications, Feb. 2010, 13(1):113-129.
Gilmer et al., "Neural message passing for quantum chemistry," arXiv: 1704.01212, Apr. 2017, 14 pages.
Gionis et al., "Similarity search in high dimensions via hashing," Vldb, Sep. 1999, 518-529.
Gori et al., "A new model for learning in graph domains," IEEE International Joint Conference on Neural Networks, Dec. 2005, 2:729-734.
Grover et al., "Node2Vec: Scalable Feature Learning for Networks," ACM, Aug. 2016, 10 pages.
Horvath et al., "Cyclic pattern kernels for predictive graph mining," Proceedings of the tenth ACM SIGKDD international conference on Knowledge discovery and data mining, Aug. 2004, 158-167.
Hu et al., "Discriminative deep metric learning for face verification in the wild," Proceedings of the IEEE Conference on Computer Vision and Pattern Recognition, Jun. 2014, 1875-1882.
Kashima et al., "Marginalized kernels between labeled graphs," Proceedings of the 20th international conference on machine learning, 2003, 321-328.
Kingma et al., "Adam: A method for stochastic optimization," arXiv:1412.6980, Dec. 2014, 15 pages.
Kipf et al., "Semi-supervised classification with graph convolutional networks," arXiv:1609.02907, Sep. 2016, 14 pages.
Koch et al., "Siamese neural networks for one-shot image recognition," ICML Deep Learning Workshop, 2015, 2:8 pages.
Kriege et al., "A survey on graph kernels," arXiv:1903.11835, Mar. 2019, 51 pages.
Li et al., "Gated graph sequence neural networks," arXiv:1511.05493, Nov. 2015, 20 pages.
Li et al., "Graph Matching Networks for Learning the Similarity of Graph Structured Objects," arXiv:1904.12787v2, May 2019, 18 pages.
Li et al., "Learning deep generative models of graphs," arXiv:1803.03324, Mar. 2018, 21 pages.
Morris et al., "Weisfeiler and leman go neural: Higher-order graph neural networks," arXiv:1810.02244, Oct. 2018, 16 pages.
Narayanan et al., "graph2vec: Learning Distributed Representations of Graphs," arXiv, Jul. 2017, 8 pages.
Niepert et al., "Learning convolutional neural networks for graphs," International conference on machine learning, May 2016, 2014-2023.

(56) References Cited

OTHER PUBLICATIONS

Perozzi et al., "DeepWalk: Online Learning of Social Representations," arXiv, Jun. 2014, 10 pages.

Pewny et al., "Cross-architecture bug search in binary executables," IEEE Symposium on Security and Privacy, May 2015, 709-724.

Qi et al., "PointNet: Deep learning on point sets for 3d classification and segmentation," IEEE Conference on Computer Vision and Pattern Recognition, Dec. 2017, 19 pages.

Raymond et al., "Calculation of graph similarity using maximum common edge subgraphs," The Computer Journal, Apr. 2002, 45(6):631-644.

Ribeiro et al., "struc2vec: Learning Node Representations from Structural Identity," arXiv, Jul. 2017, 10 pages.

Riesen et al., "IAM graph database repository for graph based pattern recognition and machine learning," Joint IAPR International Workshops on Statistical Techniques in Pattern Recognition and Structural and Syntactic Pattern Recognition, Dec. 2008, 287-297.

Scarselli et al., "The graph neural network model," IEEE Transactions on Neural Networks, Jan. 2009, 20(1):61-80.

Shasha et al., "Algorithmics and applications of tree and graph searching," Proceedings of the twenty-first ACM SIGMOD-SIGACT symposium on Principles of database systems, Jun. 2002, 39-52.

Shervashidze et al., "Efficient graphlet kernels for large graph comparison," Artificial Intelligence and Statistics, Apr. 2009, 488-495.

Shervashidze et al., "Fast subtree kernels on graphs," Advances in neural information processing systems, Dec. 2009, 1660-1668.

Shervashidze et al., "Weisfeiler-lehman graph kernels," Journal of Machine Learning Research, Sep. 2011, 12(2011):2539-2561.

Shyam et al., "Attentive recurrent comparators," arXiv:1703.00767, Mar. 2017, 9 pages.

Srinivasa et al., "A platform based on the multidimensional data model for analysis of bio-molecular structures," Proceedings of the VLDB Conference, Sep. 2003, 975-986.

Sun et al., "Deep learning face representation by joint identification-verification," Advances in neural information processing systems, Jun. 2014, 1988-1996.

Tong [online], "Graph Embedding for Deep Learning," May 6, 2019, [retrieved on Oct. 15, 2019], retrieved from: URL<https://towardsdatascience.com/overview-of-deep-learning-on-graph-embeddings-4305c10ad4a4>, 12 pages.

Vaswani et al., "Attention is all you need," Advances in Neural Information Processing Systems, Jun. 2017, 6000-6010.

Velickovic et al., "Graph attention networks," arXiv:1710.10903, Oct. 2017, 12 pages.

Vishwanathan et al., "Graph kernels," Journal of Machine Learning Research, Apr. 2010, 11(2010):1201-1242.

Wang et al., "Dynamic graph CNN for learning on point clouds," arXiv:1801.07829, Jan. 2018, 13 pages.

Wang et al., "NerveNet: Learning structured policy with graph neural networks," ICLR, 2018, 26 pages.

Weinberger et al., "Distance metric learning for large margin nearest neighbor classification," Journal of Machine Learning Research, Feb. 2009, 10(2009):207-244.

Weisfeiler et al., "A reduction of a graph to a canonical form and an algebra arising during this reduction," Nauchno-Technicheskaya Informatsia, 1968, 2(9):12-16.

Willett et al., "Chemical similarity searching," Journal of chemical information and computer sciences, Feb. 1998, 38(6):983-996.

Xing et al., "Distance metric learning with application to clustering with side-information," Advances in neural information processing systems, 2003, 521-528.

Xu et al., "Neural network-based graph embedding for cross-platform binary code similarity detection," arXiv, Jul. 2018, 14 pages.

Xu et al., "How powerful are graph neural networks?," arXiv:1810.00826, Oct. 2018, 17 pages.

Xu et al., "Neural network-based graph embedding for cross-platform binary code similarity detection," Proceedings of the 2017 ACM SIGSAC Conference on Computer and Communications Security, Oct. 2017, 363-376.

Yan et al., "Graph indexing: a frequent structure-based approach", Proceedings of the ACM SIGMOD international conference on Management of data, Jun. 2004, 335-346.

Yan et al., "Substructure similarity search in graph databases," Proceedings of the ACM SIGMOD international conference on Management of data, Jun. 2005, 766-777.

Yanardag et al., "Deep graph kernels," Proceedings of the 21th ACM SIGKDD International Conference on Knowledge Discovery and Data Mining, Aug. 2015, 1365-1374.

Zagoruyko et al., "Learning to compare image patches via convolutional neural networks," IEEE Conference on Computer Vision and Pattern Recognition, Apr. 2015, 4353-4361.

Zaheer et al., "Deep sets," Advances in Neural Information Processing Systems, Mar. 2017, 3394-3404.

Zeng et al., "Comparing stars: On approximating graph edit distance," Proceedings of the VLDB, Aug. 2009, 2(1):25-36.

\* cited by examiner

DEEP NEURAL NETWORK SYSTEM FOR SIMILARITY-BASED GRAPH REPRESENTATIONS

CROSS-REFERENCE TO RELATED APPLICATION

This application claims priority to U.S. Provisional Application No. 62/673,841, filed on May 18, 2018. The disclosure of the prior application is considered part of and is incorporated by reference in the disclosure of this application.

BACKGROUND

This specification relates to a neural network system for determining graph similarity and for indexing and retrieving data associated with graphs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines graph similarity.

Graph structures may be used to represent many different types of physical systems and entities. A system capable of determining graph similarity provides a system capable of solving many technical problems involving real-world physical entities by comparing graphs representing such entities. For example, a graph may represent a drug molecule, a computer network, a transportation network, a computer chip, a warehouse layout for control of a robotic system in the warehouse; an item of manufacture which may be used to control a robotic system to assemble, disassemble or repair the item; a graph may represent a physical location and may be used by an autonomous agent such as a self-driving vehicle to navigate through the physical location. It will be appreciated that there exists many other technical applications for generated graph structures.

In general, a graph comprises a set of nodes and a set of edges that connect two nodes. It is possible however, for graphs to have only unconnected nodes with no edges or in a special case, for a graph to contain no nodes and no edges.

A node of a graph may be used to represent a particular entity in a physical system and may have a type based upon a type of the entity. For example, a node may represent a particular atom of a molecule, the atom being of a particular type of chemical element. A feature vector may be associated with a node. The feature vector may represent the type of node and other properties of the entity represented by the node.

An edge of a graph may be used to represent a relationship between two nodes connected by the edge. For example, an edge may represent a chemical bond between two atoms or may represent a communication link between two nodes of a network. Edges may also have a type associated with, for example, if a communication link is a wired or wireless link. A feature vector may be associated with an edge. The feature vector may represent the type of edge and other properties associated with the edge. Edges may be directed or undirected. An undirected edge may be represented using a pair of directed edges having opposing directions.

The neural network system for determining graph similarity comprises one or more neural networks configured to: process an input graph to generate a vector representation of the input graph. The neural network system further comprises one or more processors configured to: receive a first graph; receive a second graph; generate a vector representation of the first graph using the one or more neural networks; generate a vector representation of the second graph using the one or more neural networks; and determine a similarity score for the first graph and the second graph based upon the vector representations of the first graph and the second graph. Processing an input graph to generate a vector representation of the input graph may comprise processing the input graph to generate a node state representation vector for each node of the input graph and an edge representation vector for each edge of the input graph; and processing the node state representation vectors and the edge representation vectors to generate the vector representation of the input graph.

By using one or more neural networks for determining the vector representation of a graph, the pertinent features for determining similarity between graphs may be learned automatically as compared to prior art methods that require hand-crafted features or similarity measures. In addition, by determining a similarity score based upon vector representations of the first and second graphs, a similarity between the graphs can be determined efficiently. For example, fast nearest neighbour search data structures such as KD-trees or locality sensitive hashing may then be used to index and store a large number of graphs and to efficiently retrieve a specific graph or graphs having similar properties. In addition, the vector representation of a graph provides a compact yet expressive representation of the graph and avoids the need to store an entire graph, resulting in reduced memory and storage requirements. This is particularly advantageous when operating on larger datasets and databases.

Aspects may include one or more of the following features. The one or more neural networks may be configured to process a pair of input graphs to generate a vector representation of each input graph of the pair of input graphs, the vector representation of each input graph being based upon both input graphs of the pair of graphs; and the vector representation of the first graph and the vector representation of the second graph may be generated based upon inputting the first graph and the second graph as a pair of input graphs to the one or more neural networks. As such, the vector representation of a first graph depends on the other graph that the first graph is compared with and vice versa. In this way, the one or more neural networks can model the differences and similarities between graphs more effectively as compared to a neural network system that models graphs independently.

The one or more neural networks may comprise an encoder neural network subsystem configured to process an input graph to generate the node state representation vector for each node of the input graph and the edge representation vector for each edge of the input graph.

The one or more neural networks may comprise a propagation neural network subsystem configured to update the node state representation vector associated with a particular node of the input graph based upon the node state representation vectors associated with one or more adjacent nodes in the input graph and the edge representation vectors associated with the edges connecting the particular node to the one or more adjacent nodes in the input graph. An adjacent node is a neighbouring node in which there exists an edge between the particular node and the adjacent node. The node state representation vector for a particular node may therefore be updated based upon information from a local neighbourhood of the particular node.

The one or more neural networks may comprise an aggregator neural network subsystem configured to process the node state representation vectors associated with each node of the input graph to generate the vector representation of the input graph.

The encoder neural network subsystem may comprise a node encoder neural network configured to generate the node state representation vector; and an edge encoder neural network configured to generate the edge representation vector.

The node state representation vector may comprise a plurality of node state representation vectors for each node of the input graph. For example, the node encoder neural network may comprise a plurality of hidden layers and an output layer; and the plurality of node state representation vectors for each node of the input graph comprises a vector corresponding to each of the plurality of hidden layers and the output layer. Alternatively, there may be a vector for each of a selection of the hidden layers and output layer. In a similar manner, the edge representation vector may also comprise a plurality of edge representation vectors for each edge of the input graph which may also correspond to each or a selection of the hidden layers and output layer of the edge encoder neural network.

An input graph may comprise a set of nodes and edges. The input graph may comprise an initial vector representation associated with each respective node and respective edge of the input graph. The initial vector representation may comprise a feature vector. The feature vector may be based upon a type of the node or edge, a direction of the edge, or any other information as appropriate based upon the domain being modelled by the graph. The initial vector representation may be initialized to a vector of all ones.

The encoder neural network subsystem may be configured to generate the node state representation vector for a node of the input graph based upon the initial vector representation associated with the node in the input graph. Likewise, the encoder neural network subsystem may be configured to generate the edge representation vector for an edge of the input graph based upon the initial vector representation associated with the edge in the input graph.

The propagation neural network subsystem may comprise a message generation neural network configured to process the node state representation vector associated with a particular node and the node state representation vector associated with an adjacent node in the input graph and the edge representation vector associated with the edge connecting the particular node and the adjacent node to generate a message vector associated with the adjacent node in the input graph. The propagation neural network subsystem may comprise a node update neural network configured to generate an updated node state representation vector associated with the particular node based upon the current node state representation vector associated with the particular node and message vectors generated for each adjacent node adjacent the particular node in the input graph. In this way, information may be propagated through the graph and the node state representation vector for a particular node may include information from the local neighbourhood of the particular node. For example, the node state representation vector may be indicative of the local structure of the input graph around the particular node.

The node update neural network may be configured to process a summation of the message vectors generated for each adjacent node adjacent the particular node in the input graph to generate the updated node state representation vector. The summation may be a weighted sum or an attention-based weighted sum.

The node update neural network may be a recurrent type of neural network. For example, the node update neural network may be a basic recurrent neural network, a gated recurrent unit (GRU) based recurrent neural network or a LSTM based recurrent neural network.

The propagation neural network subsystem may be configured to generate a cross-graph matching vector based upon a similarity between a particular node of the input graph and one or more nodes of a second input graph. The node update neural network may be configured to generate an updated node state representation vector associated with the particular node based upon the current node state representation vector associated with the particular node, the message vectors generated for each adjacent node adjacent the particular node in the input graph, and the cross-graph matching vector. In this way, additional comparisons at levels other than a final graph level comparison may be performed, enabling a more comprehensive comparison between graphs. By using the cross-graph matching vector to update the node state representation vector, the neural network system is better able to model differences and similarities between graphs as compared to a neural network system that models graphs independently. Information may be propagated between two graphs based upon the cross-graph matching vector. The model may learn to allocate capacity toward representing a graph itself and toward representing features for determining similarity as appropriate.

The similarity upon which the cross-graph matching vector is based may be based upon a similarity of the node state representation vector associated with the particular node of the input graph and the node state representation vector associated with each of the one or more nodes of the second input graph. The similarity may be based upon a difference between the node state representation vector associated with the particular node of the input graph and a weighted sum of the node state representation vectors associated with each of the one or more nodes of the second input graph. In this way, if two graphs are similar, the cross-graph matching vector is likely to be small and have limited effect on the node state representation vector and the vector graph representation of the two graphs. However, if the two graphs are dissimilar, the cross-graph matching vector is likely to have a larger value and has the effect of altering the representations of the two graphs to be further apart.

The weighted sum may be a weighted sum of all of the node state representation vectors associated with each of the nodes of the second input graph. The weight for each respective node of the one or more nodes of the second input graph may be based upon a similarity score between the node state representation vector associated with the particular node of the input graph and the node state representation vector associated with the respective node of the second input graph. In this way, the cross-graph matching vector may be a measure of how well a node of one graph matches another node in a second graph and may be a comparison between a particular node of one graph and a closest node or nodes of the second graph. The similarity score may be based upon any vector space metric. The weight for each respective node of the one or more nodes of the second input graph may be normalized. For example, by applying a softmax function to the set of similarity scores.

It will be appreciated that where a pair of graphs are input to the one or more neural networks, the second input graph is the other graph of the pair of graphs. It will also be appreciated that updating based upon a cross-graph matching vector may be performed for the second graph of the pair of input graphs in a similar manner to generate the vector representation of the second graph.

The node state representation vectors associated with each node of the input graph may undergo a plurality of updates. In this way, information in the graph may be propagated further through the graph and the node state representation vector associated with a particular node may be able to model information from beyond its immediate neighbourhood.

The one or more neural networks may comprise a plurality of propagation neural network subsystems. The propagation neural network subsystems may share a portion of the parameters of their respective neural networks.

The plurality of propagation neural network subsystems may comprise a propagation neural network subsystem for each of the plurality of hidden layers and the output layer of the node encoder neural network. Alternatively, plurality of propagation neural network subsystems may comprise a propagation neural network subsystem for a selection of the plurality of hidden layers and the output layer of the node encoder neural network.

The aggregator neural network subsystem may comprise an aggregator neural network configured to process a node state representation vector to generate a transformed vector associated with the node; and the vector representation of the input graph may be based upon a summation of the transformed vectors associated with each node of the input graph. The summation of the transformed vectors may be a weighted summation. The weights of the weighted summation may comprise a gating vector for each transformed vector. It will be appreciated that where there is a plurality of node state representation vectors associated with each node of the input graph, the aggregator neural network may be configured to generate a transformed vector for each respective node state representation vector of the plurality of node state representation vectors for subsequent summation or alternatively, the aggregator neural network may be configured to generate a transformed vector by processing the plurality of node state representation vectors jointly.

The determined similarity score for the first graph and the second graph may be based upon a Euclidean distance, cosine distance, Hamming distance or any other vector space distance metric. It will also be appreciated that where a similarity score is described as being determined, these similarity metrics may also be suitable metrics for computing a similarity score.

The one or more neural networks may be trained based upon optimization of a loss function based upon a similarity between a pair of graphs. In this way, the one or more neural networks may learn to model the pertinent features for determining similarity between graphs. In addition, the training data set does not require graphs to be labelled according to their respective classes as in supervised learning. The one or more neural networks are capable of generalizing and determining similarity even when no examples of a graph belonging to a particular class are present in the training data set.

The one or more neural networks may be implemented as an end-to-end neural network system. That is, each of the above described neural networks may be connected as appropriate and may be trained jointly. Therefore, standard gradient descent methods may be used to optimize the loss function.

The one or more neural networks may be trained based upon a training data set comprising a plurality of pairs of graphs, each pair of graphs labelled as similar or not similar. For example, a pair of similar graphs may have a label of +1 whilst a pair of dissimilar graphs may have a label of −1.

Alternatively, the one or more neural networks may be trained based upon optimization of a loss function based upon a relative similarity between a triplet of graphs. For example, each triplet of graphs may be labelled based upon whether a first graph of the triplet is closer in similarity to a second graph of the triplet or whether the first graph is closer in similarity to a third graph of the triplet. In the former case, the label may be +1 and in the latter case, the label may be −1. In this way, training does not require a data set of graphs explicitly labelled as similar or dissimilar, only whether one graph has greater similarity compared to another graph.

Two graphs may be considered similar if they are full-graph isomorphic, sub-graph isomorphic, or have small graph edit distances. Similarity may also be defined based upon similarity measures in the domain of the objects represented by the graphs.

The loss function may be a margin-based loss function. The loss function similarity may be based upon a Euclidean distance or a Hamming distance or any other suitable distance metric.

The vector representation of the input graph may be modified by applying a tanh function to the vector representation of the input graph. Each component of the vector representation of the input graph may take one of two possible values. That is, the vector representation may be binary but is not limited to having values of either zero or one and may, for example, have a value of +1 or −1.

The graph may represent one of the following: a molecule, a computer program function, a parse tree, a computer network, a vehicular traffic network, and a knowledge graph.

It will be appreciated that each of the described neural networks may be a deep neural network having a plurality of hidden layers. Each of neural networks may also be a recurrent type neural network. It will also be appreciated that where it is described that a summation is performed, it may be also possible to use an alternative form of aggregation such as a mean, median or mode.

According to another aspect, there is described a method for determining graph similarity, the method comprising, receiving, by one or more processors, a first graph; receiving, by the one or more processors, a second graph; generating, by one or more neural networks, a vector representation of the first graph; generating, by the one or more neural networks, a vector representation of the second graph using the one or more neural networks; determining, by the one or more processors, a similarity score based upon the vector representations of the first graph and the second graph. Generating, by the one or more neural networks, a vector representation of a graph may comprise: processing, by the one or more neural networks, the graph to generate a node state representation vector for each node of the graph and an edge representation vector for each edge of the graph; and processing, by the one or more neural networks, the node state representation vectors and the edge representation vectors to generate the vector representation of the graph.

According to a further aspect, there is described a system for binary function vulnerability detection comprising: one or more processors configured to: receive a first control flow graph associated with a first binary function having a known vulnerability; receive a second control flow graph associated with a second binary function; determine a similarity score for the first control flow graph and the second control flow graph using the neural network system of as described above; determining that second binary function is vulnerable if the similarity score exceeds a threshold similarity score. It is often the case that source code is unavailable for inspection and only a compiled binary function is available. The system therefore enables determining whether binary functions are vulnerable based upon their similarity to known vulnerable binary functions.

A node of a control flow graph may represent a block of instructions and an edge of a control flow graph may represent control flow between blocks of instructions. A control flow graph may be produced using a disassembler and code analyzer.

The neural network system may be trained based upon a similarity metric such that control flow graphs associated with a binary function having the same source code have higher similarity than control flow graphs associated with a binary function having different source code. In this way, invariance to compiler type and compiler optimizations may be achieved.

The one or more neural networks may further comprise a neural network configured to generate a feature vector based upon the instruction types associated with the block of instructions represented by the node. This neural network may be trained jointly with the other neural networks described above.

According to another aspect, there is provided a neural network system implemented by one or more computers for retrieval of data associated with a graph, the neural network system comprising: one or more neural networks configured to: process an input graph to generate a vector representation of the input graph; a memory storing a database comprising a plurality of records, each record of the plurality of records being associated with a respective graph; one or more processors configured to: receive a query graph; generate a vector representation of the query graph using the one or more neural networks; for each record of the plurality of records, process the vector representation of the query graph and a vector representation associated with the respective graph associated with the record to determine a respective similarity score; and outputting data associated with one or more records based upon the determined similarity scores. In this way, the plurality of records associated with a graph may be efficiently indexed using the vector representation of the graph. As the one or more neural networks are capable of modeling graphs such that the pertinent features for determining similarity between graphs is reflected in the vector representation, the index also functions as means to efficiently store graphs and their associated records by similarity, enabling efficient means to search for records associated with similar graphs and to retrieve records associated with a specific query graph. Processing an input graph to generate a vector representation of the input graph may comprise processing the input graph to generate a node state representation vector for each node of the input graph and an edge representation vector for each edge of the input graph; and processing the node state representation vectors and the edge representation vectors to generate the vector representation of the input graph.

The one or more neural networks may be further configured to process a pair of input graphs to generate a vector representation of each input graph of the pair of input graphs, the vector representation of each input graph being based upon both input graphs of the pair of graphs; and the one or more processors may be further configured to: determine a set of candidate graphs based upon the determined similarity scores between the vector representations of the query graph and each respective graph associated with each of the plurality of records; determine a second vector representation for each query graph and candidate graph pair in the set of candidate graphs using the one or more neural networks; determine a similarity score for each query graph and candidate graph pair based upon the determined second vector representations; and outputting data associated with the record associated with a candidate graph based upon the determined similarity scores for each query graph and candidate graph pair. In this way, by first determining similarity of graphs based upon vector representations of graphs generated independently, a set of candidate graphs may be quickly determined. The set of candidate graphs may be then be compared more precisely by generating vector graph representations using the query graph and each respective candidate graph as an input pair to the one or more neural networks.

The neural network can be configured to receive any kind of digital data input and to generate any kind of score, classification, or regression output based on the input.

For example, if the inputs to the neural network are graphs representative of images or features that have been extracted from images, the output generated by the neural network for a given image may be used to determine an estimated likelihood that the image contains an image of an object belonging to the category based upon the determined similarity score.

As another example, if the inputs to the neural network are graphs representative of Internet resources (e.g., web pages), documents, or portions of documents or features extracted from Internet resources, documents, or portions of documents, the output generated by the neural network for a given Internet resource, document, or portion of a document may be used to determine for each of a set of topics, an estimated likelihood that the Internet resource, document, or document portion is about the topic based upon the determined similarity score.

As another example, if the inputs to the neural network are graphs representative of features of an impression context for a particular advertisement, the output generated by the neural network may be used to determine an estimated likelihood that the particular advertisement will be clicked on based upon the determined similarity score.

As another example, if the inputs to the neural network are graphs representative of features of a personalized recommendation for a user, e.g., features characterizing the context for the recommendation, e.g., features characterizing previous actions taken by the user, the output generated by the neural network may be used for each of a set of content items, to determine an estimated likelihood that the user will respond favorably to being recommended the content item based upon the determined similarity score.

As another example, if the input to the neural network is a graph representative of a sequence of text in one language, the output generated by the neural network may be used to determine for each of a set of pieces of text in another language, an estimated likelihood that the piece of text in the other language is a proper translation of the input text into the other language based upon the determined similarity score.

As another example, if the input to the neural network is a graph representative of a sequence representing a spoken utterance, the output generated by the neural network may be used to determine for each of a set of pieces of text, an estimated likelihood that the piece of text is the correct transcript for the utterance based upon the determined similarity score.

The subject matter described in this specification can be implemented in particular embodiments so as to realize one or more of the following advantages.

By using one or more neural networks for determining the vector representation of a graph, the pertinent features for determining similarity between graphs may be learned automatically as compared to prior art methods that require hand-crafted features or similarity measures. In addition, by determining a similarity score based upon vector representations of the first and second graphs, a similarity between the graphs can be determined efficiently. For example, fast nearest neighbour search data structures such as KD-trees or locality sensitive hashing may then be used to index and store a large number of graphs and to efficiently retrieve a specific graph or graphs having similar properties. In addition, the vector representation of a graph provides a compact yet expressive representation of the graph and avoids the need to store an entire graph, resulting in reduced memory and storage requirements. This is particularly advantageous when operating on larger datasets and databases.

Where both graphs being compared are input to the one or more neural networks to generate a vector representation of the graphs, the one or more neural networks are able to perform additional comparisons between the graphs, the results of which may be reflected by the vector representation of the two graphs. As such, the vector representation of the two graphs provides more information relating to their similarity and enables an efficient vector space comparison to be performed to provide an accurate similarity score.

In the context of data retrieval from a database, the plurality of records associated with a graph may be efficiently indexed using the vector representation of the graph. As the one or more neural networks are capable of modeling graphs such that the pertinent features for determining similarity between graphs is reflected in the vector representation, the index also functions as means to efficiently store graphs and their associated records by similarity, enabling efficient means to search for records associated with similar graphs and to retrieve records associated with a specific query graph.

The neural network system may be used in many other different applications, for example, searching and retrieval from large databases of molecules, generation of similar molecules to a particular molecule, for example for drug discovery, determining alternative network architectures and vulnerabilities in network architectures, determining alternative traffic routes and determining variants of computer viruses.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
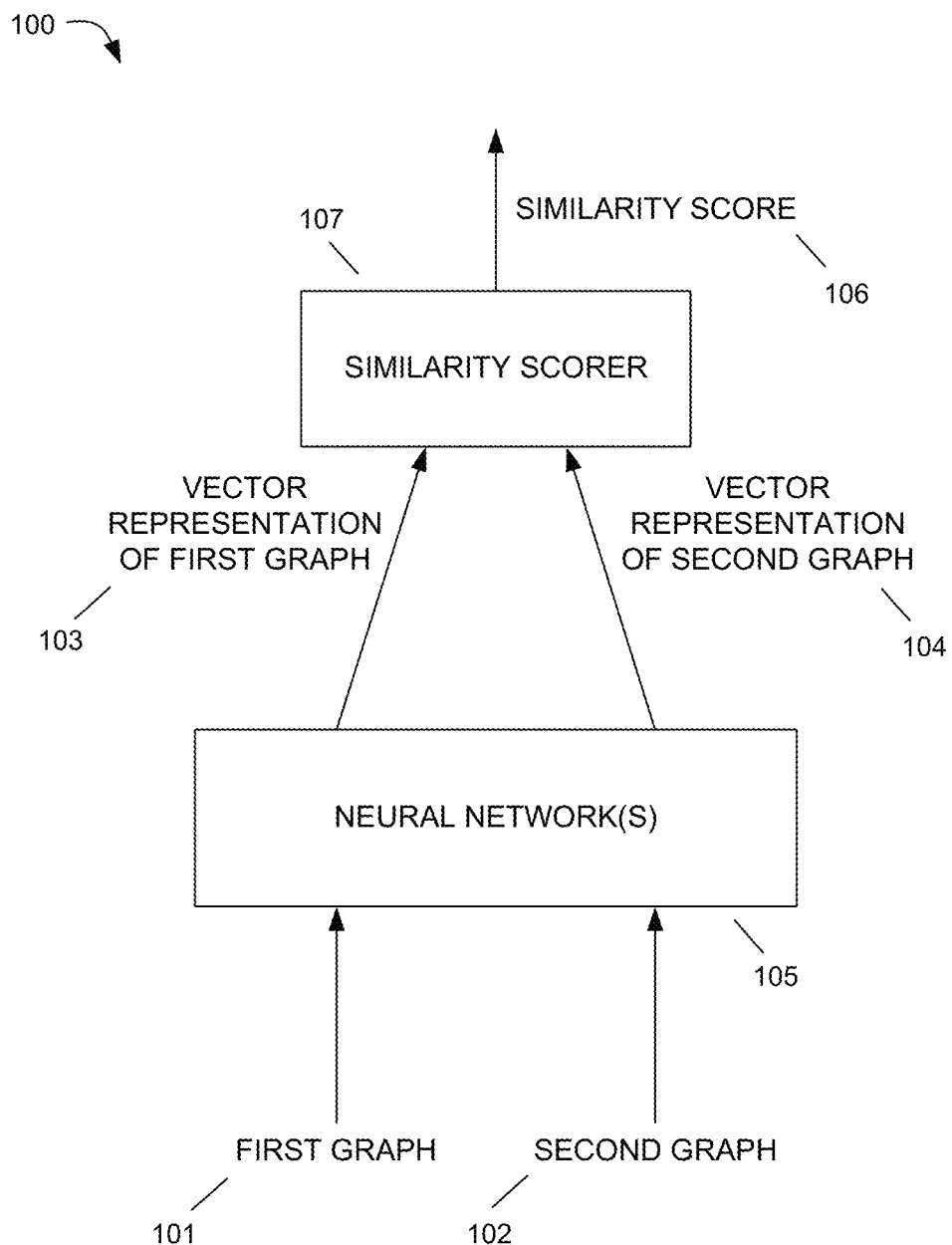
FIG. 1 shows an example neural network system for determining graph similarity.

FIG. 1 shows an example neural network system 100 for determining graph similarity. The neural network system 100 is an example of a system implemented as computer programs on one or more computers in one or more locations, in which the systems, components, and techniques described below can be implemented. As such, the system comprises one or more processors.

The one or more processors are configured to receive a first graph 101 and a second graph 102 of which it is desired to determine a similarity between. The one or more processors are further configured to generate a vector representation 103 of the first graph and a vector representation 104 of the second graph using one or more neural networks 105. The one or more processors are also configured to determine a similarity score 106 for the first graph 101 and the second graph 102 based upon the generated vector representations 103, 104 of the first and second graphs. The similarity score 106 may be determined using a similarity scorer subsystem 107. The computation of a similarity score 106 is described in more detail below.

The system 100 also comprises the one or more neural networks 105 for generating a vector representation of an input graph. In this regard, the one or more neural networks 105 are configured to process an input graph to generate a node state representation vector for each node of the input graph and an edge representation vector for each edge of the input graph. The one or more neural networks 105 are further configured to process the node state representation vectors and the edge representation vectors to generate a vector representation of the input graph.

It is also possible for the one or more neural networks 105 to process a pair of input graphs together to generate a vector representation of each input graph of the pair of input graphs. Thus, the vector representation of each input graph is based upon both input graphs of the pair of input graphs rather than processing each input graph separately and generating the vector representation of the input graphs independently.

That is, the one or more neural networks 105 may be configured to generate the vector representation of the first graph 103 and the vector representation of the second graph 105 by processing the first graph 101 and the second graph 102 individually. Where a vector representation of an input graph is obtained by processing an individual input graph, this is referred to as a graph embedding model. Alternatively, the one or more neural networks 105 may be configured to generate the vector representation of the first graph 103 and the vector representation of the second graph 105 by processing the first graph 101 and the second graph 102 together. This case is referred to as a graph matching model. Both embedding models and matching models will be described in more detail below.

Figure 2:
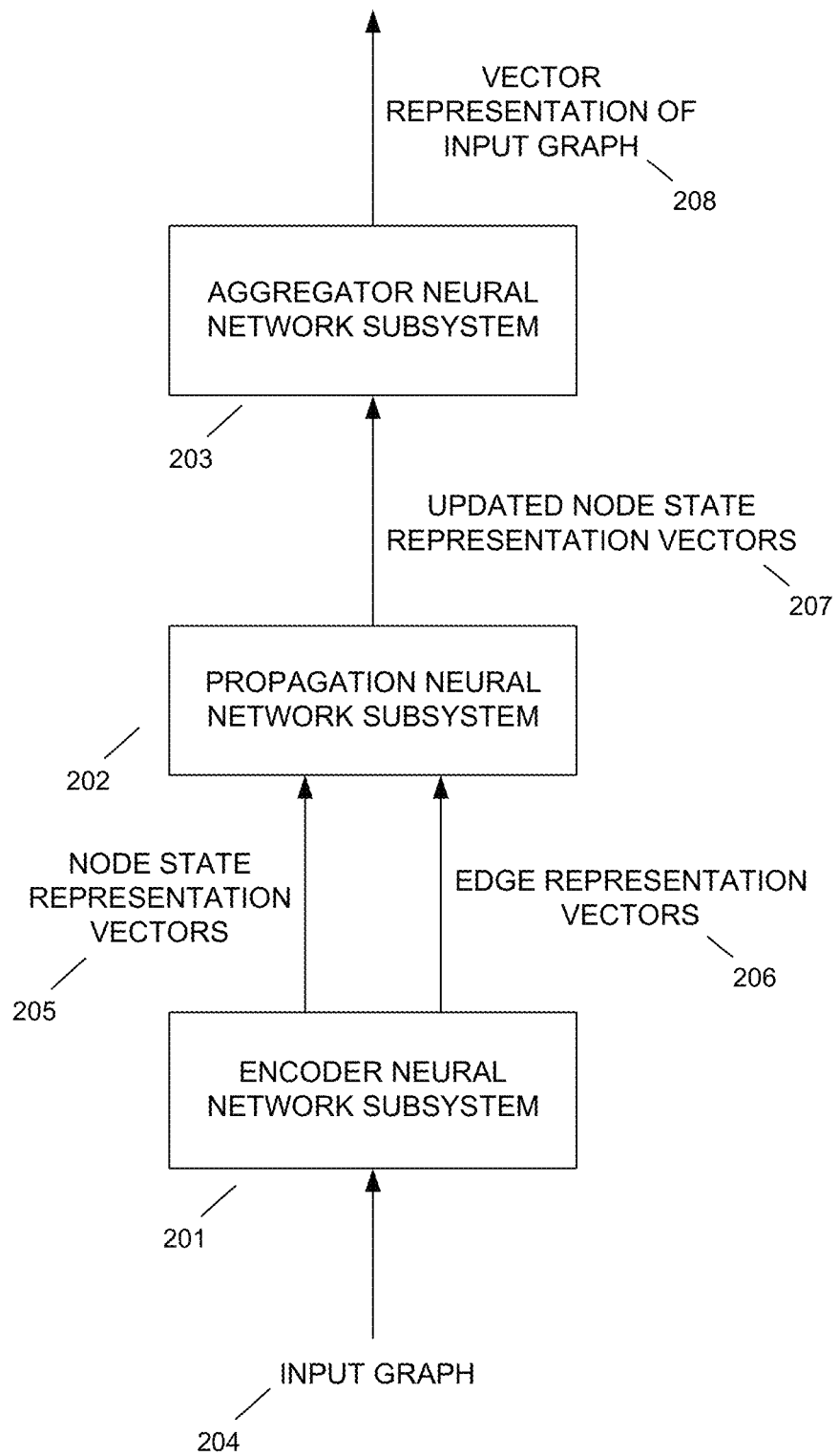
FIG. 2 shows exemplary neural network subsystems of the neural network system in more detail.

Referring now to FIG. 2, in both graph embedding and graph matching models, the one or more neural networks 105 may comprise an encoder neural network subsystem 201, a propagation neural network subsystem 202 and an aggregator neural network subsystem 203.

The encoder neural network subsystem 201 may be configured to process an input graph 204 to generate the node state representation vector 205 for each node of the input graph and the edge representation vector 206 for each edge of the input graph. For both the graph embedding and graph matching models, input graphs are typically processed individually by the encoder neural network subsystem 201 and thus the node state representation vectors 205 and the edge representation vectors 206 for an input graph 204 are generated based upon the input graph 204 independent of any second input graph. In the graph matching model, the first and second input graphs may be processed in parallel to generate the node state representation vectors and edge representation vectors for the first and second input graphs at the same time.

The encoder neural network subsystem 201 may further comprise a node encoder neural network configured to generate the node state representation vector and an edge encoder neural network configured to generate the edge representation vector. For example, the node encoder neural network may be a multi-layer perceptron network and the node state representation vector for a node may be obtained as follows:

$$h_i^{(0)} = MLP_{node}(x_i), \forall i \in V \quad (1)$$

where V is the set of nodes of the graph, i is an index over the set of nodes, $x_i$ is a feature vector associated with node i, $MLP_{node}$ is the node encoder neural network and $h_i^{(0)}$ is the node state representation vector for node i. Where nodes do not have associated feature vectors, $x_i$ may, for example, be initialized to a vector of 1s.

In a similar manner, the edge encoder neural network may also be a multi-layer perceptron network and the edge representation vector for an edge may be obtained as follows:

$$e_{ij} = MLP_{edge}(x_{ij}), \forall (i,j) \in E \quad (2)$$

where E is the set of edges of the graph, (i,j) is an edge in the set connecting a node i and node j of the graph, $x_{ij}$ is feature vector associated with edge (i,j), $MLP_{edge}$ is the edge encoder neural network and $e_{ij}$ is the edge representation vector for edge (i,j). Where edges do not have associated feature vectors, $x_{ij}$ may, for example, be initialized to a vector of 1s.

The node encoder neural network may comprise a plurality of hidden layers and an output layer. The node state representation vector may be a concatenation of the hidden layer activations and the output layer activations. As such, the node state representation vector may comprise a plurality of node state representation vectors for each node of the input graph and may comprise a vector corresponding to each of the plurality of hidden layers and the output layers. Alternatively, the node state representation vector may comprise any subset of the hidden layer and output layer vectors concatenated.

The propagation neural network subsystem 202 may be configured to update the node state representation vector 205 associated with a particular node of the input graph based upon the node state representation vectors associated with one or more adjacent nodes in the input graph and the edge representation vectors associated with the edges connecting the particular node to the one or more adjacent nodes in the input graph. That is, for a particular node, the node state representation vector 205 may be updated based upon the nodes and edges that the particular node is connected to. In this way, the node state representation vector 205 for a particular node is updated based upon information from the particular node's local neighbourhood. The node state representation vector is therefore also based upon the structure of the graph rather than treating a graph as just an independent set of nodes. Further details of this updating are provided below with reference to FIGS. 3 and 4.

The aggregator neural network subsystem 203 may be configured to process the node state representation vectors associated with each node of the input graph to generate the vector representation 208 of the input graph 204. The node state representation vectors processed by the aggregator neural network subsystem 203 may be the updated node state representation vectors 207 output by the propagation neural network subsystem 202. Alternatively, the node state representation vectors 205 may be those output by the encoder neural network subsystem 201 or may be a combination of updated node state representation vectors for a subset of nodes and initial node state representation vectors for the rest of the nodes of the input graph 204.

As an example, the vector representation 208 of the input graph 204 may be obtained as follows:

$$h_G = MLP_G\left(\sum_{i \in V} \sigma(MLP_{gate}(h_i^{(T)})) \odot MLP(h_i^{(T)})\right) \quad (3)$$

where $h_i^{(T)}$ is the node state representation vector for node i after T rounds of updates, $\odot$ is an element-wise vector multiplication, MLP is an aggregator neural network configured to process a node state representation vector to generate a transformed vector associated with the node, $MLP_{gate}$ is a multi-layer perceptron configured to output a gating vector for node i based upon its node state representation vector, $MLP_G$ is a further multi-layer perceptron and $h_G$ is the vector representation of the input graph. In general terms, the above equation (3) computes a vector representation of the input graph by processing a weighted sum of the node state representation vectors of each node of the input graph through a neural network. $MLP_{gate}$ and MLP may comprise a single linear layer each having the same dimensionality as the required dimensionality of the vector representation of the graph. $MLP_G$ may comprise one hidden layer with ReLU non-linearity. It will be appreciated that other architectures and other non-linearities may be chosen as deemed appropriate by a person skilled in the art.

Equation (3) may be used in both the graph embedding and graph matching models. In the graph matching model, once the node state representation vectors have been obtained and undergone a desired number of rounds of updating, the node state representation vectors for the first and second input graphs may be processed independently to obtain vector representations of the first and second input graphs respectively.

The vector representation of a graph may be a vector of real-values or may be a vector of binary values. It will be appreciated that where the vector is binary valued, the binary values may be two values other than 0 and 1, and may, for example, be −1 and 1. A vector of binary values may be advantageous in cases where it is necessary to search through a large database of graphs with low latency where efficient nearest neighbor search algorithms may be applied.

A similarity score 106 for any two graphs may be determined based upon a comparison of the vector representations of the two respective graphs. For example, the comparison may be based upon any vector space metric such as a Euclidean distance, cosine similarity or Hamming distance.

Figure 3:
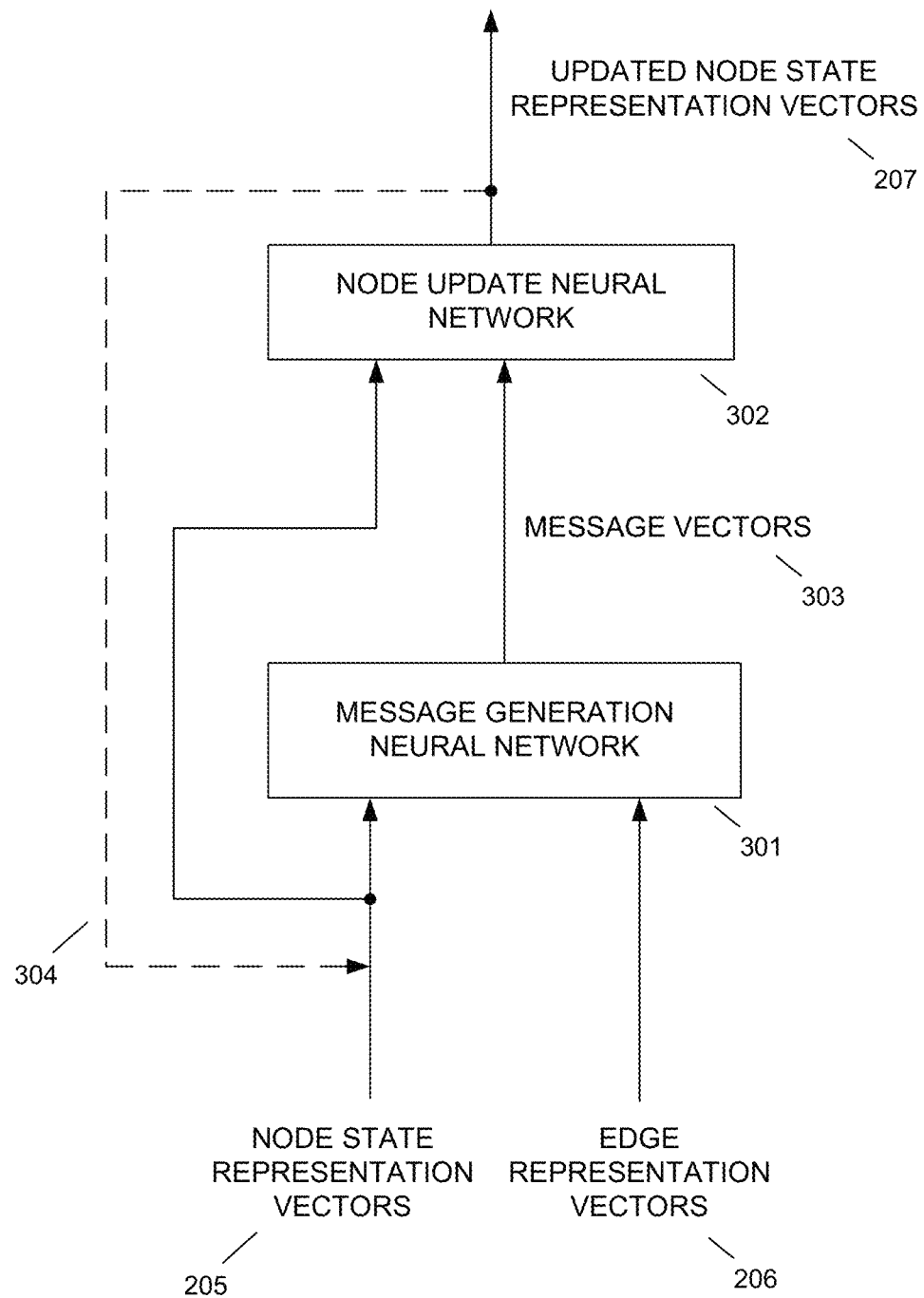
FIG. 3 shows an exemplary configuration of the propagation neural network subsystem.

Referring now to FIG. 3, an exemplary configuration of the propagation neural network subsystem 202 will be described in more detail. The propagation neural network subsystem 202 may comprise a message generation neural network 301 and a node update neural network 302.

The message generation neural network 301 may be configured to process the node state representation vector associated with a particular node and the node state representation vector associated with an adjacent node in the input graph and the edge representation vector associated with the edge connecting the particular node and the adjacent node to generate a message vector associated with the adjacent node in the input graph. That is, for each node that a particular node is connected to, a message vector can be generated using the message generation neural network 301 as exemplified below:

$$m_{j \to i} = f_{message}(h_i^{(t)}, h_j^{(t)}, e_{ij}) \quad (4)$$

where $m_{j \to i}$ is a generated message vector for the connection between node j and node i, $h_i^{(t)}$ is the current node state representation vector for node i after the latest update round t, $h_j^{(t)}$ is the current node state representation vector for node j after the latest update round t, $e_{ij}$ is the edge representation vector associated with the edge connecting nodes i and j, and $f_{message}$ is the message generation neural network 301. As an example, the message generation neural network 301 may be a multi-layer perceptron having one hidden layer with rectified linear units (ReLU). However, it will be appreciated that other forms of neural network may be suitable for implementing the message generation neural network 301. The inputs, $h_i^{(t)}$, $h_j^{(t)}$, $e_{ij}$ to the message generation neural network 301 may be concatenated together to form a single vector input.

The node update neural network 302 may be configured to generate an updated node state representation vector associated with the particular node based upon the current node state representation vector associated with the particular node and the message vectors 303 generated for each adjacent node adjacent the particular node in the input graph. That is, a particular node's state vector representation may be updated based upon information obtained from adjacent nodes as exemplified below $$h_i^{(t+1)} = f_{node}\left(h_i^{(t)}, \sum_{j:(j,i) \in E} m_{j \to i}\right) \quad (5)$$

where $\Sigma_{j:(j,i) \in E} \, m_{j \to i}$ is a sum of the message vectors associated with all nodes connected to node i, $h_i^{(t)}$ is the current node state representation vector for node i after the latest update round t, $h_i^{(t+1)}$ is the updated node state representation vector for node i, and $f_{node}$ is the node update neural network 302. As an example, the node update neural network 302 may be a multi-layer perceptron or a recurrent neural network comprising conventional recurrent neural network units (RNN), gated recurrent units (GRU), or long-term short term memory units (LSTM). It will be appreciated that the sum in the above equation (5) may be replaced by an alternative aggregation operator, for example, a mean, a maximum, or an attention based weighted sum amongst others.

The system 100 may be configured to perform multiple rounds of node state vector representation updates. That is, as shown by the dashed line 304 in FIG. 3, an updated node state representation vector 207 may be fed back into the message generation neural network 301 for further processing to generate further message vectors in order to perform a second round of updating by the node update neural network 302. By performing multiple rounds of propagation, nodes may accumulate information in relation to the structure of the graph outside of the node's local neighbourhood. The number of rounds of updates may be chosen as deemed appropriate by a person skilled in the art. As an example, the number of rounds of updates may be between 1 and 5.

Figure 4:
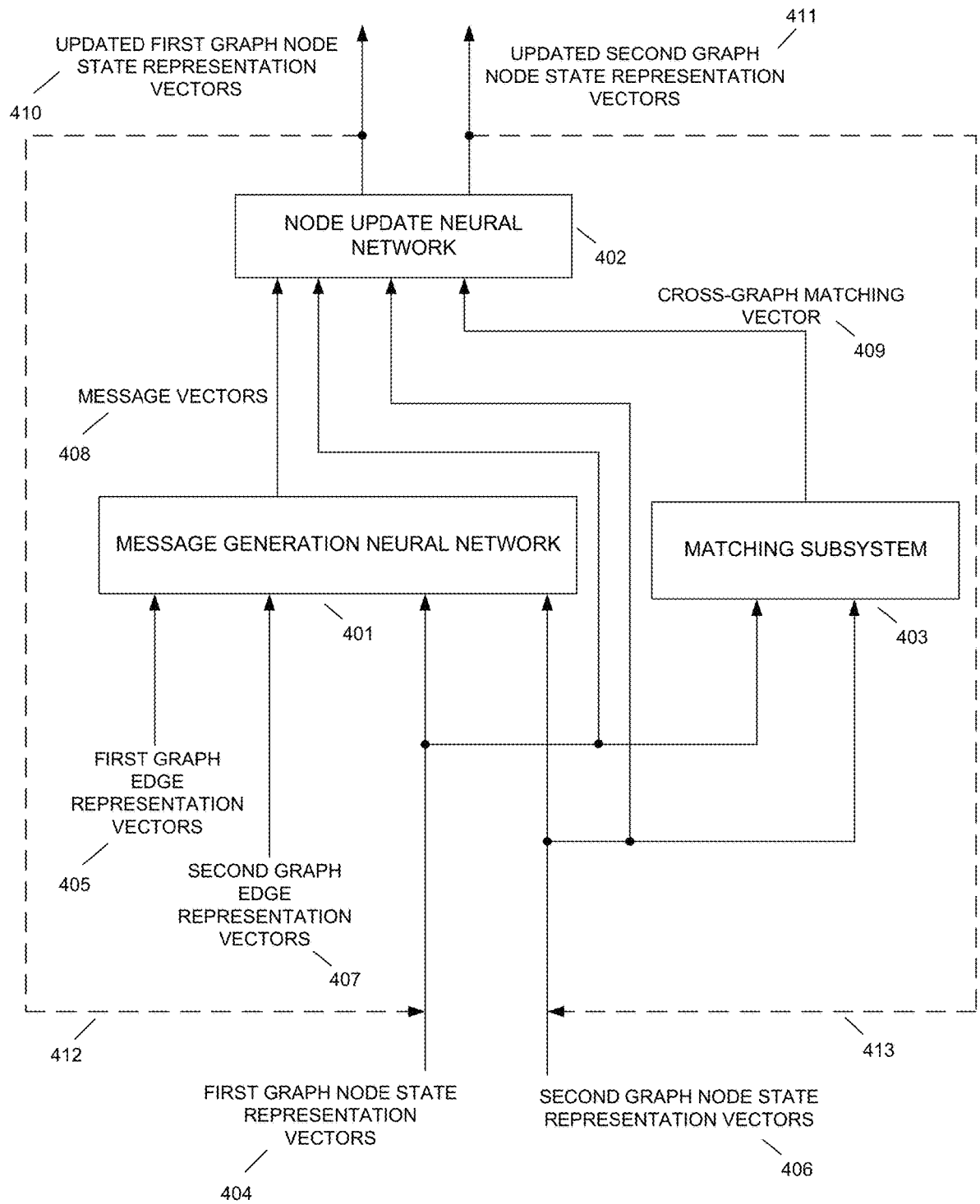
FIG. 4 shows another exemplary configuration of the propagation neural network subsystem.

Referring now to FIG. 4, an alternative configuration of the propagation neural network subsystem 202 will be described. In particular, this alternative configuration is particularly suitable for use as part of the graph matching model. This configuration also comprises a message generation neural network 401 and a node update neural network 402 along with an additional matching subsystem 403.

The message generation neural network 401 may be configured to process the node state representation vectors 404, 406 and the edge representation vectors 405, 407 of a first and second input graph 101, 102 respectively to generate message vectors 408. The message generation neural network 401 is configured to generate message vectors 408 in a similar manner to the message generation neural network 301 of FIG. 3. For example, a message vector may be generated as follows:

$$m_{j \to i} = f_{message}(h_i^{(t)}, h_j^{(t)}, e_{ij}), \forall (i,j) \in E_1 \cup E_2 \quad (6)$$

where $E_1$ and $E_2$ are the set of edges of the first input graph and the second input graph respectively with the other terms having the same meaning as equation (4) above. As there are no edges connecting nodes of the first and second graphs, the message generation neural network 401 of FIG. 4 effectively operates in the same way as the message generation neural network 301 of FIG. 3 when applied to two graphs individually.

The matching subsystem 403 may be configured to generate a cross-graph matching vector 409 based upon a similarity between a particular node of the first input graph 101 and one or more nodes of the second input graph 102. In general terms, the cross-graph matching vector provides a measure of how well a node in one graph can be matched to one or more nodes in a second graph.

As an example, the cross-graph matching vector may be obtained as follows:

$$\mu_{j \to i} = f_{match}(h_i^{(t)}, h_j^{(t)}), \forall i \in V_1, j \in V_2, \text{ or } i \in V_2, j \in V_1 \quad (7)$$

where $V_1$ and $V_2$ are the set of nodes in the first and second graphs respectively, i and j are a pair of nodes, each node of the pair from different graphs for which a matching is to be performed, $h_i^{(t)}$ and $h_j^{(t)}$ are the respective current node state representation vectors of nodes i and j, $f_{match}$ is a chosen matching function, and $\mu_{j \to i}$ is the cross-graph matching vector for nodes i and j.

The matching function, $f_{match}$, (and hence the similarity between a node of one input graph and a node of another input graph) may be based upon a difference between the node state representation vector associated with the particular node of the input graph and a weighted sum of the node state representation vectors associated with each of the one or more nodes of the second input graph. For example, an attention based weighted sum may be used as follows:

$$a_{j \to i} = \frac{\exp(s_h(h_i^{(t)}, h_j^{(t)}))}{\sum_{j'} \exp(s_h(h_i^{(t)}, h_{j'}^{(t)}))} \tag{8}$$

$$\mu_{j \to i} = a_{j \to i}(h_i^{(t)} - h_j^{(t)}) \tag{9}$$

where $a_{j \to i}$ is the attention weight for the pair of nodes i and j, the sum in the denominator runs over one or more nodes j' in the graph comprising node j, and $s_h$ is vector-based similarity metric such as a Euclidean distance, cosine similarity or Hamming distance.

Figure 5A:
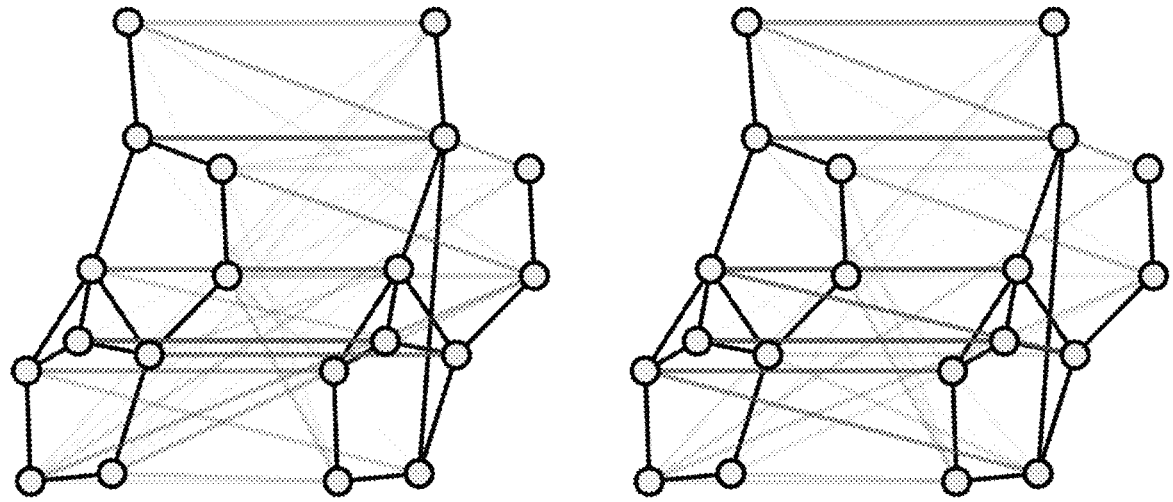
FIGS. 5A and 5B show visualizations of attention weights for two pairs of exemplary graphs.
Figure 5B:
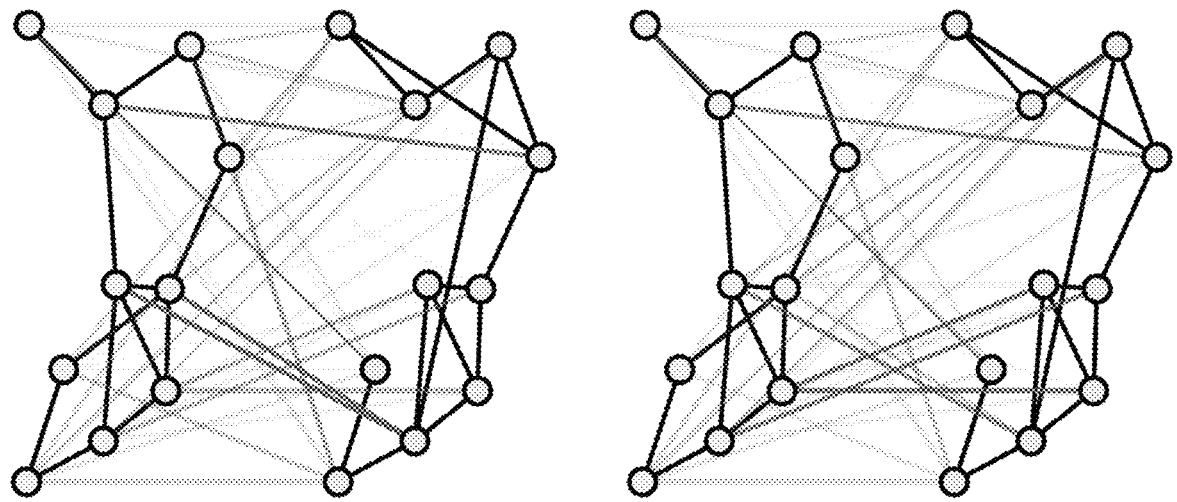

FIGS. 5A and 5B show visualizations of attention weights for two pairs of exemplary graphs. In FIG. 5A, the pair of graphs has a graph edit distance of 1. In FIG. 5B, the pair of graphs has a graph edit distance of 2. The left-hand drawing of both FIGS. 5A and 5B shows the attention from the left graph to the right graph of the pair of graphs. The right-hand drawing of both FIGS. 5A and 5B show the attention from the right graph to the left graph of the same pair of graphs. The darker lines indicate a larger attention weight between a node of graph and a node of the other graph.

The node update neural network 402 may be configured to generate an updated node state representation vector associated with a particular node based upon the current node state representation vector associated with the particular node, the message vectors generated for each adjacent node adjacent the particular node in its input graph, and the cross-graph matching vector 409. For example, an updated node state representation vector may be generated as follows:

$$h_i^{(t+1)} = f_{node}\left(h_i^{(t)}, \sum_j m_{j \to i}, \sum_{j'} \mu_{j' \to i}\right) \tag{10}$$

where $h_i^{(t+1)}$ is the updated node state representation vector for node i, $f_{node}$ is the node update network 402, $h_i^{(t)}$ is the current node state representation vector for node i, $\Sigma_j m_{j \to i}$ is a sum of the message vectors associated with all nodes connected to node i, and $\Sigma_{j'} \mu_{j' \to i}$ is a sum of the computed cross-graph matching vectors for node i and one or more nodes j' of the other input graph. Where the cross-graph matching vectors are computed using the attention-based weighted sum of equation (9), the sum of the computed cross-graph matching vectors may be re-written as:

$$\sum_{j'} \mu_{j' \to i} = \sum_j a_{j' \to i}(h_i^{(t)} - h_{j'}^{(t)}) = h_i^{(t)} - \sum_{j'} (a_{j' \to i} h_{j'}^{(t)}) \tag{11}$$

Similar to the node update neural network 302 of FIG. 3, the node update neural network 402 in this configuration may also be a multi-layer perceptron or a recurrent neural network comprising conventional recurrent neural network units (RNN), gated recurrent units (GRU), or long-term short term memory units (LSTM).

Similar to the configuration of FIG. 3, multiple rounds of node state vector representation updates may be performed and as shown by the dashed lines 412, 413 in FIG. 4. Updated node state representation vectors 410, 411 for the first and second input graphs may be fed back into the message generation neural network 401 for further processing to generate further message vectors and into the matching subsystem 403 to generate further cross-graph matching vectors in order to perform additional rounds of updating by the node update neural network 402.

The one or more neural networks of the neural network system 100 may be trained using a training dataset of graphs comprising example pairs or triplets of graphs. Where the training data comprises pairs of graphs, each pair has an associated label indicating whether the two graphs are similar or dissimilar. Where the training data comprises a triplet of graphs, the triplet may be labelled based upon a relative similarity, for example, whether a first graph of the triplet is more similar to the second or third graph of the triplet.

The one or more neural networks may be trained based upon optimizing a loss function using gradient descent based algorithms. The loss function may be a margin-based loss function. For example, where the training dataset comprises pairs of graphs, the loss function may be a margin-based pairwise loss having the form:

$$L_{pair} = \mathbb{E}_{(G_1,G_2,t)}[\max\{0,\gamma-t(1-d(G_1,G_2))\}] \tag{12}$$

where $\gamma > 0$ is a margin parameter, t is the label for the pair of graphs $G_1$, $G_2$, for example, $-1$ for a pair of dissimilar graphs, 1 for a pair of similar graphs, and $d(G_1, G_2)$ is the Euclidean distance between the vector representations of the two graphs. The above loss function encourages $d(G_1, G_2) < 1-\gamma$ where the pair is similar (t=1), and $d(G_1, G_2) < 1+\gamma$ when the pair is dissimilar (t=$-1$).

Where the training data comprises triplets of graphs having a relative similarity, the loss function may be a margin-based triplet loss having the form:

$$L_{triplet} = \mathbb{E}_{(G_1,G_2,G_3)}[\max\{0,d(G_1,G_2)-d(G_1,G_3)+\gamma\}] \tag{13}$$

where the terms have the same meaning as in equation (12). The loss function encourages $d(G_1, G_2)$ to be smaller than $d(G_1, G_3)$ by at least a margin $\gamma$.

Alternatively, rather than using the Euclidean distance as part of the loss function, it is possible to use the Hamming distance and to minimize the Hamming distance between similar graphs and maximize the Hamming distance for dissimilar graphs.

For example, the loss functions may take the form:

$$L_{pair} = \mathbb{E}_{(G_1,G_2,t)}[(t-s(G_1,G_2))^2]/4 \tag{14}$$

$$L_{triplet} = \mathbb{E}_{(G_1,G_2,G_3)}[(s(G_1,G_2)-1)^2+(s(G_1,G_3)+1)^2]/8 \tag{15}$$

and where $$s(G_1, G_2) = \frac{1}{H}\sum_{i=1}^{H} \tanh(h_{G_1 i}) \cdot \tanh(h_{G_2 i}) \tag{16}$$

is an approximate average Hamming distance.

Figure 6:
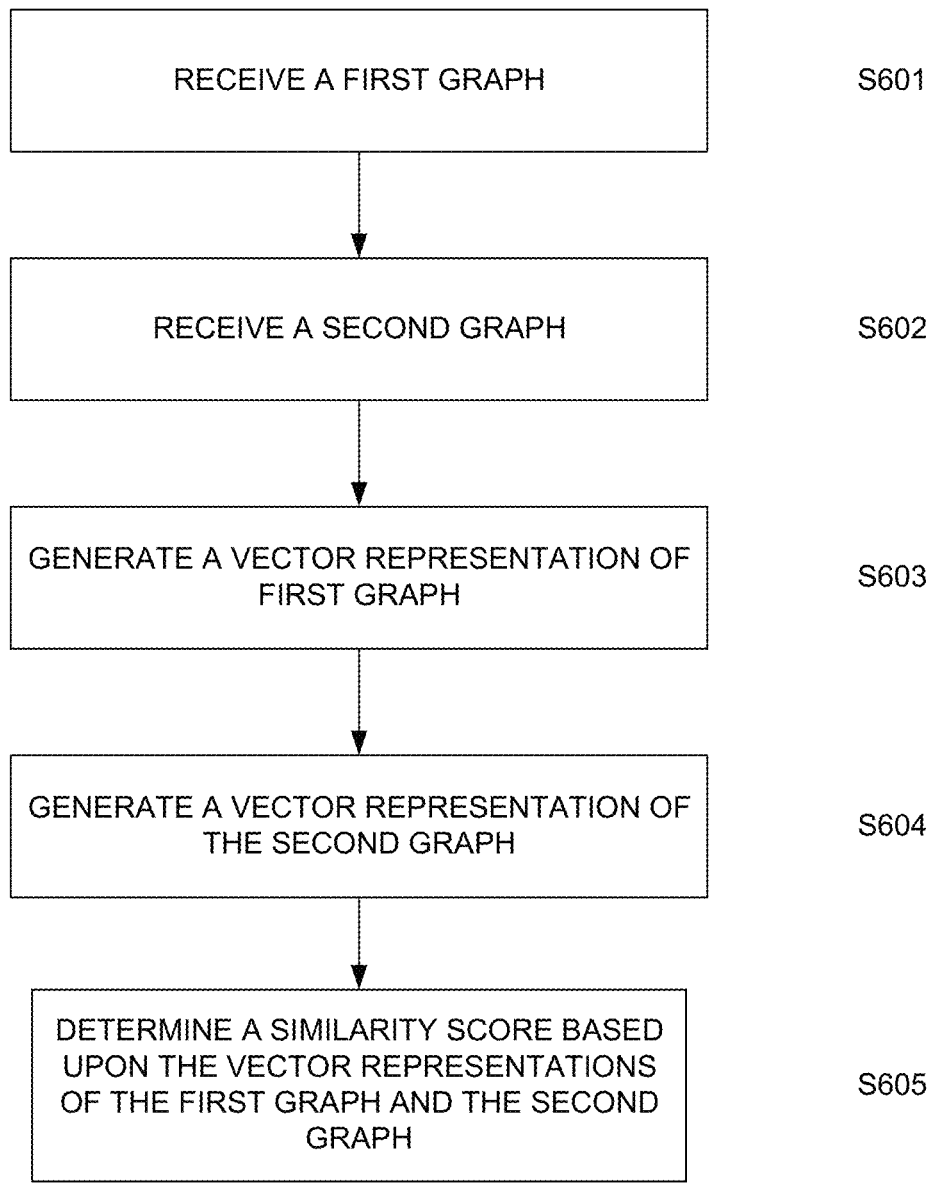
FIG. 6 is a flow chart of an example process for determining graph similarity.

Referring now to FIG. 6, processing for determining graph similarity will now be described. It will be appreciated that the processing may be performed by the neural network system 100. At step S601, a first graph 101 is received by one or more processors. At step S602, a second graph 102 is received by the one or more processors.

A vector representation of the first graph is generated by one or more neural networks at step S603 and a vector representation of the second graph is generated by the one or more neural networks at step S604. Generating a vector representation of a graph may comprise processing the graph to generate a node state representation vector for each node of the graph and an edge representation vector for each edge of the graph by the one or more neural networks. The node state representation vectors and the edge representation vectors are then processed by the one or more neural networks to generate the vector representation of the graph. The operations for generating a vector representation of a graph may be carried out as described above with reference to FIGS. 2 to 4.

At step S605, the one or more processors then determines a similarity score based upon the vector representations of the first and second graphs generated at steps S603 and S604.

It will be appreciated that whilst the above processing is presented as being carried out in a particular order, it is not intended to limit to any particular ordering of steps and the above steps may be carried out in a different order. For example, the vector representation of the first graph may be determined prior to receipt of the second graph. It is also possible that steps are carried out in parallel rather than as a sequential process. For example, the generation of the first and second vector representations of the graph may be performed in parallel.

The above described neural network system may be used as part of a system for binary function vulnerability detection. For example, where a program, library or portion of binary code has a known vulnerability, it is desirable to determine whether there exists other binary code that may be susceptible to the same vulnerability or where there exists a database of code having known vulnerabilities and it is desirable to determine whether a query piece of code is susceptible to any known vulnerabilities in the database. This is particularly useful where access to source code is not available, for example, when dealing with commercial or embedded software or suspicious executables. Alternatively, where source code is available, the system may also be applied to source code and is not limited to binary functions.

Figure 7:
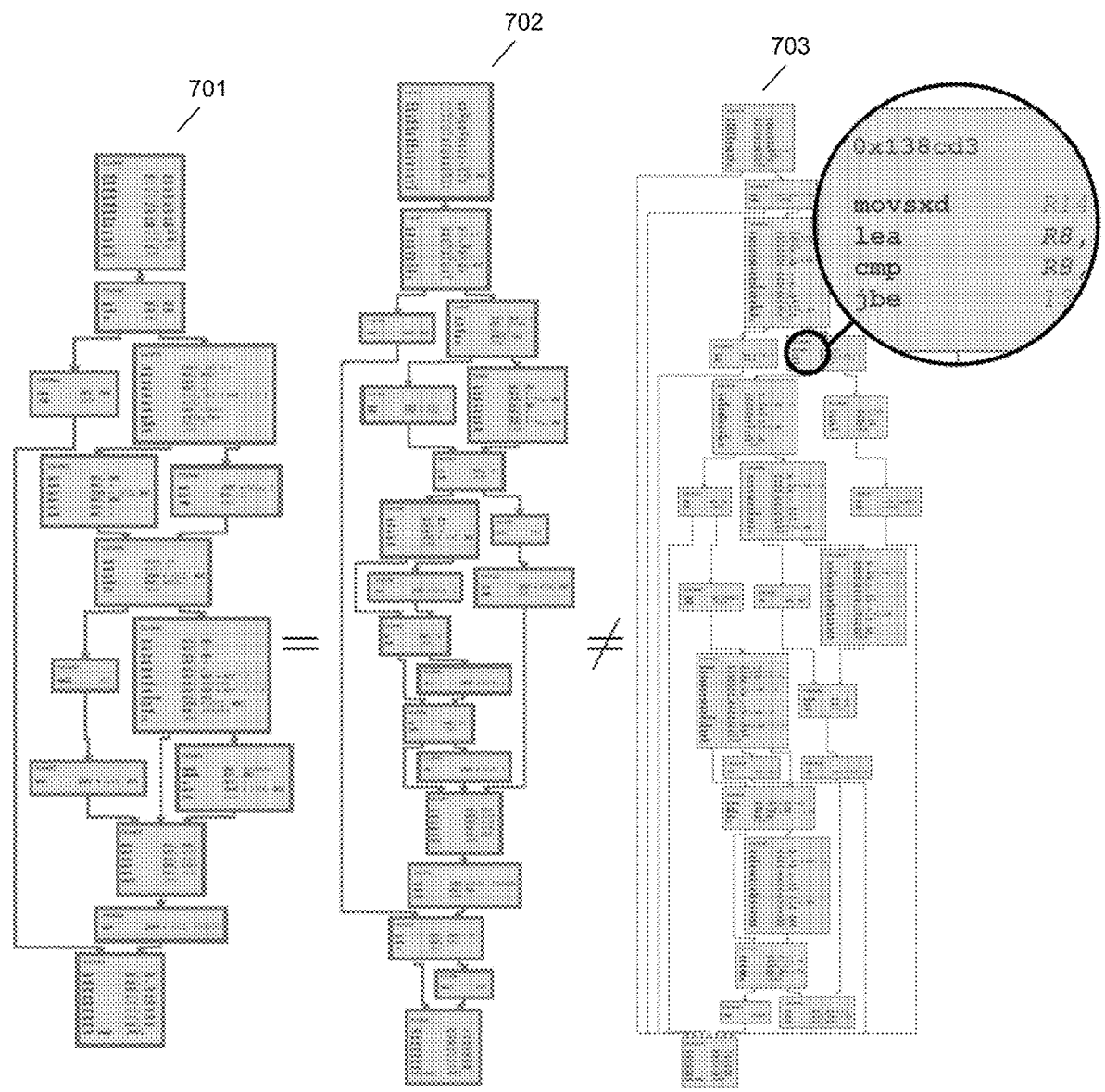
FIG. 7 shows two exemplary control flow graphs.

A binary function may be represented as a control flow graph. A node in a control flow graph may be a basic block of assembly instructions with edges representing control flow, for example, a jump or return instruction used in branching, loops or function calls. A control flow graph may be obtained by processing the binary function using a disassembler and a code analyzer. FIG. 7 shows two exemplary control flow graphs 701, 702 which are deemed to be similar as they have been generated based upon the same function but using different compilers. FIG. 7 also shows a third exemplary control flow graph 703 which has been generated using a different function and is therefore dissimilar to the first and second control flow graphs 701, 702.

This type of the problem is challenging as graphs having different structures may still be similar whilst graphs having small differences may not be similar.

The system for binary function vulnerability detection may comprise one or more processors configured to receive a first control flow graph associated a first binary function having a known vulnerability and a second control flow graph associated with a second binary function to be tested. Using the neural network system described above, vector representations of the first and second control flow graphs may be obtained and a similarity score between them may be generated. The second binary function may be determined as having the same vulnerability as the first binary function if the similarity score exceeds a threshold. Further binary functions may be compared with the first binary function in a similar manner to determine their susceptibility. By using the neural network system as described above, it is possible to learn a graph representation and similarity scoring that is that improves performance over classical graph theoretical matching algorithms and hand crafted features.

The system for binary function vulnerability detection may be trained based upon a similarity metric such that control flow graphs associated with a binary function having the same source code have higher similarity than control flow graphs associated with a binary function having different source code. For example, a training dataset may be generated by compiling source code using different compilers or different compiler optimization flags.

A control flow graph may also be associated with a feature vector based upon instruction types associated with the block of instructions represented by the node. These feature vectors may also be generated using a neural network and trained jointly with the neural network system for determining graph similarity.

In another example, the neural network system for determining graph similarity may be used as part of a system for retrieval of data. A graph may be provided as a query and a database may be searched to retrieve associated data. For example, the graph may be a representation of a molecule for which it is desired to find other molecules having similar properties.

The system for retrieving data associated with a graph may comprise one or more processors configured to receive a query graph and to generate a vector representation of the query graph using the one or more neural network as described above. The system may further comprise a database comprising a plurality of records, each record of the plurality of records being associated with a respective graph. For each record of the plurality of records, the one or more processors may be configured to process the vector representation of the query graph and a vector representation associated with the respective graph associated with the record to determine a respective similarity score and to output data associated with one or more records based upon the determined similarity score.

The above described neural network system may be used as part of a system for other technical applications. For example, a graph may represent a drug molecule and the system may be used to compare molecules e.g., for generating new potentially viable drugs. Each respective node of the graph may represent an atom of the molecule or a secondary structural element of a protein such as an alpha helix or beta sheet, i.e., a part of the molecule. Each respective edge of the graph may represent an interaction between nodes such as a chemical bond between the atoms of the molecule or one or more hydrogen bonds between the secondary structural elements, i.e., chemical bonds between the parts. The system may be trained on data representing molecules and optionally their known properties. The trained system may then be used to identify graphs representing other physically realistic molecules with the same or similar properties to those in the training data e.g., molecules that bind to a particular site and/or families of drugs. Based on the similarity score the system may be used to generate molecule such as a drug candidate, which may then be evaluated e.g., in silico or by synthesizing and testing the molecule in vitro or in vivo.

In another example, a graph may represent a transportation network in which the nodes represent physical locations and the edges routing paths. The system may be used to determine a route by comparing graphs representing routing paths e.g., to configure an efficient transportation network. Following on from this the system may be used for controlling an object, e.g., a vehicle on a road or a robot in a warehouse, to travel along the determined route.

In a similar way a graph may represent a computer network or electronic communications network in which the nodes represent entities on the network such as servers and routers and the edges routing paths. The system may then be used to determine a route for communications data e.g., a data packet, e.g., by comparing graphs representing different network configurations, and subsequently to route data e.g., the packet.

In a further similar way a graph may represent an electronic circuit design e.g., an integrated circuit design, in which the nodes represent elements in the circuit such as transistors or logic elements and the edges routing paths between the nodes. The system may then be used to determine routes for communicating between or connecting the elements e.g., by comparing graphs representing different routing configurations, and may subsequently be used to build an electronic circuit to the design.

In another similar way a graph may represent a static or moving physical structure in which the nodes represent elements of the structure and the edges connections between the elements. For example in the case of a building the nodes may represent e.g., floors, walls, roof, foundations, piers, decking and the edges connecting elements such as girders, beams, struts and ties. In another application the nodes may represent elements of a machine or deployable structure and edges their connections. The system may then be for comparing structures e.g., to design or evaluate a structure; the result may then be used to construct a structure to the design.

In a further example a graph may represent a visual scene and may capture semantic relationships between objects/parts of objects. Thus the nodes may represent elements of the scene e.g., increasingly larger elements of the scene and the edges relationships between the elements e.g., to which objects elements of the scene belong. The system may then be used to compare different scenes on the basis of their semantic content, e.g., for identifying of classifying a scene or for identifying a group of objects defining an object or coherent part of a scene e.g., to facilitate object/scene manipulation (editing) or information extraction (interpretation).

In a further example a graph may represent a parse trees or other linguistic structures for use in natural language processing and translation. For example the nodes may represent words, word pieces, or phrases, in a natural language and the edges their relations. The system may then be used to compare different pieces of natural language text on the basis of their semantic content.

It will be appreciated that there exists many other technical applications for generated graph structures and representations based upon similarity.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers for determining graph similarity, the neural network system comprising:
    one or more neural networks configured to:
        process an input graph to generate a node state representation vector for each node of the input graph and an edge representation vector for each edge of the input graph; and process the node state representation vectors and the edge representation vectors to generate a vector representation of the input graph;

one or more processors configured to:
- receive a first graph;
- receive a second graph;
- generate a vector representation of the first graph using the one or more neural networks;
- generate a vector representation of the second graph using the one or more neural networks;
- determine a similarity score for the first graph and the second graph based upon the vector representations of the first graph and the second graph, wherein the one or more neural networks are configured to process a pair of input graphs to generate a vector representation of each input graph of the pair of input graphs, the vector representation of each input graph being based upon both input graphs of the pair of graphs; and wherein the vector representation of the first graph and the vector representation of the second graph are generated based upon inputting the first graph and the second graph as a pair of input graphs to the one or more neural networks.

2. The system of claim 1, wherein the one or more neural networks comprises:
- an encoder neural network subsystem configured to process an input graph to generate the node state representation vector for each node of the input graph and the edge representation vector for each edge of the input graph;
- a propagation neural network subsystem configured to update the node state representation vector associated with a particular node of the input graph based upon the node state representation vectors associated with one or more adjacent nodes in the input graph and the edge representation vectors associated with the edges connecting the particular node to the one or more adjacent nodes in the input graph;
- an aggregator neural network subsystem configured to process the node state representation vectors associated with each node of the input graph to generate the vector representation of the input graph.

3. The system of claim 2, wherein the encoder neural network subsystem comprises:
- a node encoder neural network configured to generate the node state representation vector; and
- an edge encoder neural network configured to generate the edge representation vector.

4. The system of claim 3, wherein the node encoder neural network comprises a plurality of hidden layers and an output layer; and the node state representation vector comprises a plurality of node state representation vectors for each node of the input graph comprising a vector corresponding to each of the plurality of hidden layers and the output layer.

5. The system of claim 2, wherein the propagation neural network subsystem comprises:
- a message generation neural network configured to process the node state representation vector associated with a particular node and the node state representation vector associated with an adjacent node in the input graph and the edge representation vector associated with the edge connecting the particular node and the adjacent node to generate a message vector associated with the adjacent node in the input graph; and
- a node update neural network configured to generate an updated node state representation vector associated with the particular node based upon the current node state representation vector associated with the particular node and message vectors generated for each adjacent node adjacent the particular node in the input graph.

6. The system of claim 5, wherein the node update neural network is further configured to process a summation of the message vectors generated for each adjacent node adjacent the particular node in the input graph to generate the updated node state representation vector.

7. The system of claim 6, wherein the summation is a weighted sum or an attention-based weighted sum.

8. The system of claim 5, wherein the node update neural network is a recurrent type of neural network.

9. The system of claim 5, wherein the propagation neural network subsystem is further configured to generate a cross-graph matching vector based upon a similarity between a particular node of the input graph and one or more nodes of a second input graph; and wherein the node update neural network is further configured to generate an updated node state representation vector associated with the particular node based upon the current node state representation vector associated with the particular node, the message vectors generated for each adjacent node adjacent the particular node in the input graph, and the cross-graph matching vector.

10. The system of claim 9, wherein the similarity between a particular node of the input graph and one or more nodes of the second input graph is based upon a difference between the node state representation vector associated with the particular node of the input graph and a weighted sum of the node state representation vectors associated with each of the one or more nodes of the second input graph.

11. The system of claim 10, wherein the weighted sum is a weighted sum of all of the node state representation vectors associated with each of the nodes of the second input graph.

12. The system of claim 11, wherein the weight for each respective node of the one or more nodes of the second input graph is based upon a similarity score between the node state representation vector associated with the particular node of the input graph and the node state representation vector associated with the respective node of the second input graph.

13. The system of claim 2, wherein the node state representation vectors associated with each node of the input graph undergo a plurality of updates.

14. The system of claim 4, wherein the one or more neural networks comprises a propagation neural network subsystem for each of the plurality of hidden layers and the output layer of the node encoder neural network.

15. The system of claim 2, wherein the aggregator neural network subsystem comprises an aggregator neural network configured to process a node state representation vector to generate a transformed vector associated with the node; and wherein the vector representation of the input graph is based upon a summation of the transformed vectors associated with each node of the input graph.

16. The system of claim 15, wherein the summation of the transformed vectors is a weighted summation.

17. The system of claim 1, wherein the similarity score is based upon one of the following: a Euclidean distance, a cosine similarity or a Hamming distance.

18. The system of claim 1, wherein the one or more neural networks are trained based upon optimization of a loss function based upon a similarity between a pair of graphs.

19. The system of claim 1, wherein the one or more neural networks are trained based upon optimization of a loss function based upon a relative similarity between a triplet of graphs.

20. The system of claim 18, wherein the loss function is a margin-based loss function.

21. The system of claim 1, wherein the graph represents one of the following: a molecule, a computer program function, a parse tree, a computer network, a vehicular traffic network, and a knowledge graph.

22. A method of determining graph similarity, the method comprising:
receiving, by one or more processors, a first graph;
receiving, by the one or more processors, a second graph;
generating, by one or more neural networks, a vector representation of the first graph;
generating, by the one or more neural networks, a vector representation of the second graph, wherein generating, by the one or more neural networks, a vector representation of a graph comprises:
processing, by the one or more neural networks, the graph to generate a node state representation vector for each node of the graph and an edge representation vector for each edge of the graph; and
processing, by the one or more neural networks, the node state representation vectors and the edge representation vectors to generate the vector representation of the graph;
determining, by the one or more processors, a similarity score based upon the vector representations of the first graph and the second graph, wherein the one or more neural networks are configured to process a pair of input graphs to generate a vector representation of each input graph of the pair of input graphs, the vector representation of each input graph being based upon both input graphs of the pair of graphs; and wherein
the vector representation of the first graph and the vector representation of the second graph are generated based upon inputting the first graph and the second graph as a pair of input graphs to the one or more neural networks.

23. The system of claim 1,
wherein the first graph is a first control flow graph associated with a first binary function having a known vulnerability; and
wherein the second graph is a second control flow graph associated with a second binary function; and
wherein the one or more processors are further configured to:
determine that the second binary function is vulnerable if the determined similarity score exceeds a threshold similarity score.

24. The system of claim 23, wherein a node of a control flow graph represents a block of instructions and an edge of a control flow graph represents control flow between blocks of instructions.

25. The system of claim 23, wherein the neural network system is trained based upon a similarity metric such that control flow graphs associated with a binary function having the same source code have higher similarity than control flow graphs associated with a binary function having different source code.

26. The system of claim 24, wherein each node of the control flow graph is associated with a feature vector based upon instruction types associated with the block of instructions represented by the node.

27. The system of claim 26, wherein the one or more neural networks further comprises a neural network configured to generate the feature vector based upon the instruction types associated with the block of instructions represented by the node.

28. The system of claim 1 further comprising:
a memory storing a database comprising a plurality of records, each record of the plurality of records being associated with a respective graph; and
wherein the first graph is a query graph; and
wherein the second graph is a respective graph associated with a respective record of the plurality of records; and
wherein determining the similarity score for the first graph and the second graph comprises determining a similarity score between the query graph and each of the respective graphs associated with each record of the plurality of records based upon the vector representations of the query graph and the respective graphs; and
wherein the one or more processors are further configured to:
output data associated with one or more records based upon the determined similarity scores.

29. The system of claim 28, wherein the one or more neural networks are further configured to process a pair of input graphs to generate a vector representation of each input graph of the pair of input graphs, the vector representation of each input graph being based upon both input graphs of the pair of graphs; and wherein
the one or more processors are further configured to:
determine a set of candidate graphs based upon the determined similarity scores between the vector representations of the query graph and each respective graph associated with each of the plurality of records;
determine a second vector representation for each query graph and candidate graph pair in the set of candidate graphs using the one or more neural networks;
determine a similarity score for each query graph and candidate graph pair based upon the determined second vector representations; and
outputting data associated with the record associated with a candidate graph based upon the determined similarity scores for each query graph and candidate graph pair.

30. One or more non-transitory computer-readable storage media storing instructions that when executed by one or more computers cause the one or more computers to implement a neural network system for determining graph similarity, the neural network system comprising:
one or more neural networks configured to:
process an input graph to generate a node state representation vector for each node of the input graph and an edge representation vector for each edge of the input graph; and
process the node state representation vectors and the edge representation vectors to generate a vector representation of the input graph;
one or more processors configured to:
receive a first graph;
receive a second graph;
generate a vector representation of the first graph using the one or more neural networks;
generate a vector representation of the second graph using the one or more neural networks;
determine a similarity score for the first graph and the second graph based upon the vector representations of the first graph and the second graph, wherein the one or more neural networks are configured to process a pair of input graphs to generate a vector representation of each input graph of the pair of input graphs, the vector representation of each input graph being based upon both input graphs of the pair of graphs; and wherein the vector representation of the first graph and the vector representation of the second graph are generated based upon inputting the first graph and the second graph as a pair of input graphs to the one or more neural networks.

* * * * *